Figures 1, 2:
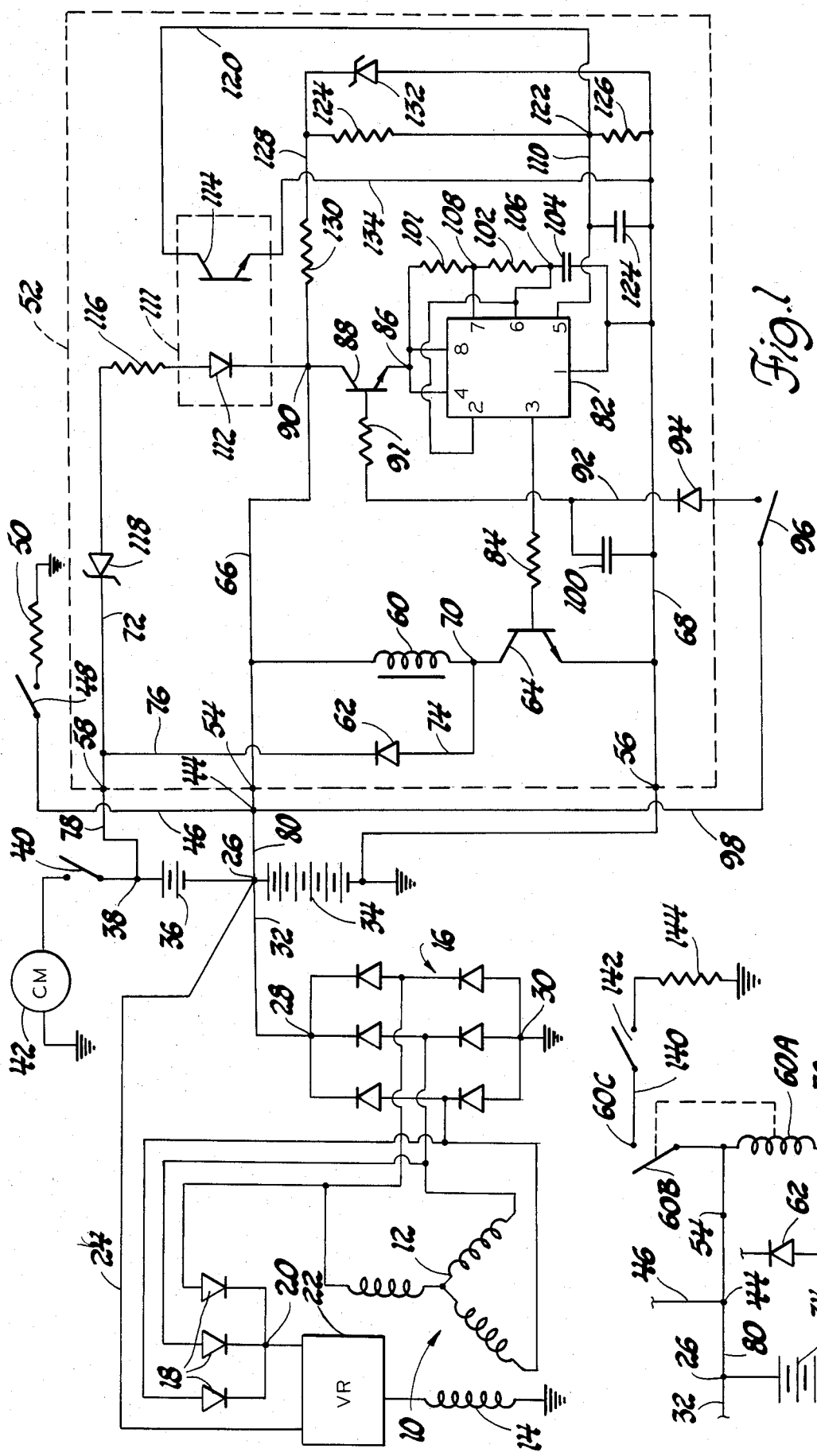

United States Patent [19]

Nowakowski

[11] Patent Number: 4,492,912
[45] Date of Patent: Jan. 8, 1985

[54] DUAL VOLTAGE MOTOR VEHICLE ELECTRICAL SYSTEM

[75] Inventor: Robert J. Nowakowski, Indianapolis, Ind.

[73] Assignee: General Motors Corporation, Detroit, Mich.

[21] Appl. No.: 457,495

[22] Filed: Jan. 12, 1983

[51] Int. Cl.³ .............................. H02J 7/14; H02J 7/24
[52] U.S. Cl. ......................................... 320/6; 320/17; 320/64; 322/26
[58] Field of Search ........................................ 320/2–4, 320/6, 7, 15–17, 21, 22, 51, 64, 37; 322/89, 90, 26; 307/16

[56] References Cited

U.S. PATENT DOCUMENTS

| | | | |
|---|---|---|---|
| 3,663,947 | 5/1972 | Pfefeer | 322/26 |
| 3,868,558 | 2/1975 | Winkley et al. | 320/37 X |
| 3,900,784 | 8/1975 | Seike | 320/17 X |
| 4,047,088 | 9/1977 | Himmler | 320/17 X |
| 4,136,311 | 1/1979 | Scheidler | 320/37 X |
| 4,210,856 | 7/1980 | Taylor | 320/17 |
| 4,310,793 | 1/1982 | Sheldrake et al. | 320/37 X |

Primary Examiner—R. J. Hickey
Attorney, Agent, or Firm—C. R. Meland

[57] ABSTRACT

A dual voltage motor vehicle electrical system comprising series connected cranking and accessory batteries that are used to energize an electric vehicle engine cranking motor. The accessory battery is charged by a vehicle engine driven generator and the cranking battery is charged by a battery charging circuit having an input connected to the accessory battery and an output connected to the cranking battery. The battery charging circuit is maintained in operation for a period of time after shut down of the engine to charge the cranking battery from the accessory battery. The battery charging circuit includes an inductance coil for transferring energy between the accessory and cranking batteries which may take the form of an actuating coil of a magnetic switch the contacts of which disconnect the accessory battery from an electrical load when the actuating coil is deenergized.

5 Claims, 2 Drawing Figures

DUAL VOLTAGE MOTOR VEHICLE ELECTRICAL SYSTEM

This invention relates to a dual voltage motor vehicle electrical system where a pair of series connected batteries are utilized to energize the vehicle electric cranking motor at a voltage equal to the sum of the voltages of the batteries and where one of the batteries is used to supply the vehicle accessory electrical loads.

Dual voltage motor vehicle electrical systems, that utilize two series connected batteries are known, examples being the systems disclosed in the U.S. Pat. Ser No. 3,671,843 to Huntzinger et al., and to Raver U.S. Pat. Ser. No. 3,863,127. In these systems one of the batteries, which may be termed the accessory battery, is charged directly from the engine driven battery charging generator. The other battery, which may be termed a cranking battery, may be used only for engine cranking. In the Huntzinger et al. patent the cranking battery is charged by a DC to DC converter from the generator that charges the accessory battery and in the Raver patent the cranking battery is charged by a transformer-rectifier connected to the generator. In these prior art systems charging of both batteries is terminated as soon as the engine that drives the generator is shut down.

In systems where the cranking battery is only charged when the vehicle engine is running to drive the generator and where the vehicle is operated for short run periods of time between cranking modes of operation the cranking battery may not be adequately charged particularly where the charging circuit for the cranking battery provides a relatively low level of charging current.

It accordingly is one of the objects of this invention to provide adequate charging current to the cranking battery of a dual voltage motor vehicle electrical system under conditions of operation where the battery charging generator is only operated for short periods of time between engine cranking modes of operation. This is accomplished in accordance with this invention by providing a system wherein the cranking battery is charged from the accessory battery for a time period following shut down of the vehicle engine that drives the generator. Thus, while the vehicle is parked the charging system of this invention may charge the cranking battery from the accessory battery for a predetermined time period.

Another object of this invention is to provide a charging system of the type described wherein the level of charging current to the cranking battery is controlled as an inverse function of the voltage of the cranking battery to prevent overcharging of the cranking battery.

Still another object of this invention is to provide a motor vehicle electrical system of the type described where the cranking battery has a lower terminal voltage than the accessory battery and wherein the cranking battery is charged from the accessory battery after the engine is shut down.

Another object of this invention is to provide a motor vehicle electrical system of the type that utilizes a low power output battery charger for charging the cranking battery from the accessory battery but yet is capable of maintaining the cranking battery at an acceptable state of charge. The battery charger is comprised of relating low cost and low power elements and has relatively low efficiency. However, the system of this invention maintains the cranking battery at a proper state of charge due to the fact that the cranking battery can be charged from the accessory battery when the engine is shut down.

A more specific object of this invention is to provide a charging system for pulse charging the cranking battery from the accessory battery that comprises an inductor that is energized from the accessory battery and discharges stored energy into the cranking battery. The charging system comprises switching means that is controlled by an oscillator which is maintained in operation for a time period after shut down of the vehicle engine. The oscillator is controlled so as to regulate charging current to the cranking battery as an inverse function of cranking battery voltage.

Still another object of this invention is to provide a battery charging system wherein the inductor that is energized and deenergized to charge the cranking battery comprises the actuating coil of a magnetic switch having contacts controlled by energization of the actuating coil and wherein the contacts are connected between the accessory battery and an electrical load to disconnect the accessory battery and load when the contacts are open. The actuating coil is energized and deenergized at a rate sufficient to maintain the contacts closed when the actuating coil is being utilized to charge the cranking battery. When the engine is shut down the cranking battery continues to be charged for a time period by current pulsing the actuating coil. When this time period expires the actuating coil is deenergized to cause the contacts to open and thereby disconnect the accessory battery from the electrical load.

IN THE DRAWINGS

FIG. 1 is a schematic circuit diagram of a motor vehicle electrical system made in accordance with this invention; and FIG. 2 illustrates a modification that can be made to the circuit of FIG. 1 to provide for delayed turn off of certain electrical loads.

Referring now to the drawings and more particularly to FIG. 1, the reference numeral 10 generally designates an alternating current generator having a three-phase Y-connected output winding 12 and a field winding 14. The field winding 14 is carried by the rotor of the generator in a manner well known to those skilled in the art which is driven by the motor vehicle engine. The three-phase output winding 12 is connected to the AC input terminals of a three-phase full wave bridge rectifier generally designated by reference numeral 16. The phase windings are also connected to a so-called diode trio comprised of diodes 18, the cathodes of which are connected to junction 20. The junction 20 supplies field current to field winding 14 through a conventional voltage regulator 22 which controls the amount of current supplied to the field winding 14. The voltage regulator has a voltage sensing terminal connected to conductor 24 which in turn is connected to junction 26. The voltage regulator is well known and may, for example, be of the type disclosed in the U.S. Pat. Ser. No. 3,597,654 to Harland et al.

The bridge rectifier 16 has a positive direct voltage output terminal 28 and a negative direct voltage output terminal 30 which is grounded. The direct voltage output terminal 28 is connected to junction 26 by a conductor 32. A 12 volt battery 34 has its positive terminal connected to junction 26 and has its negative terminal grounded. The junction 26 is connected to the negative terminal of a cranking storage battery designated by reference numeral 36. The battery 36 has a lower terminal voltage than the battery 34, for example 4 volts.

The positive terminal of battery 36 is connected to a junction 38. The junction 38 is connected to a switch 40 which controls the energization of an electric cranking motor designated by reference numeral 42 which, when energized, is utilized to crank the engine of the vehicle. One side of the cranking motor is grounded, as illustrated, and it can be seen that when switch 40 is closed the cranking motor is initially energized with 16 volts since batteries 34 and 36 are connected in series and the effective voltage applied to the cranking motor is the voltage appearing between conductor 38 and ground. This voltage of course drops as the cranking motor loads down the batteries.

The junction 26 is connected to a junction 44 which in turn is connected to conductor 46. The conductor 46 is illustrated as being connected to a switch 48 which controls the energization of electrical load 50. The electrical load 50 designates the accessory loads on a motor vehicle, for example the headlamps and the other motor vehicle loads commonly supplied by a 12 volt system.

The voltage regulator 22 senses the voltage between junction 26 and ground and in a conventional fashion regulates the output voltage of the diode rectified alternating current generator to provide a charging voltage between conductor 32 and ground. Where the battery 34 is a 12 volt battery the charging voltage may be regulated to a value of approximately 14 volts.

The cranking battery 36 is connected such that the only electrical load that it supplies is the cranking motor 42. The battery 36 is charged by a battery charging circuit, enclosed by a dotted line, and generally designated by reference numeral 52. This battery charging circuit has input terminals 54 and 56 which are connected across battery 34. Thus, input terminal 54 is connected to junction 26 and input terminal 56 is grounded as illustrated. The battery charging circuit 52 has output terminals 54 and 58 connected across the cranking battery 36. The battery charging circuit for battery 36 comprises an inductor coil 60, a diode 62 and an NPN transistor 64 which is switched on and off. The inductor 60 and the collector and emitter electrodes of transistor 64 are connected in series between conductors 66 and 68. The junction 70, connected between inductor 60 and the collector of transistor 64, is connected to conductor 72 via conductors 74 and 76 and the diode 62.

When the transistor 64 is biased conductive current flow is from conductor 66 to conductor 68 to energize coil 60 and cause a storage of energy in the coil 60. This current is supplied by the voltage appearing between junction 26 and ground. When transistor 64 is biased nonconductive the voltage developed in inductor 60, due to the collapse of the magnetic field, applies a voltage and current to the battery 36 via a circuit that can be traced from junction 70, conductor 74, diode 62, conductor 76, junction 58, conductor 78 to the positive terminal of battery 36 and then via conductor 80 and junction 54 to the opposite side of the inductor 60 as will be described in detail hereinafter. The switching frequency of transistor 64 is controlled such that a relatively low value average charging current is supplied to battery 36, for example in a range of approximately 0.1 to 1.00 amps, depending on the voltage of battery 36.

The switching of transistor 64 is controlled by an integrated circuit chip operating as a square wave oscillator and generally designated by reference numeral 82. This integrated circuit may be a National Semiconductor type LM-555 or equivalent. The terminals of the oscillator chip 82 are shown in the drawing and identified by numerals. The number 3 terminal (Output) of the integrated circuit 82, is connected to the base of switching transistor 64 by a resistor 84. The output of the integrated circuit develops a square wave voltage at output terminal 3 which biases transistor 64 on and off. Terminals 4 (Reset) and 8 (+Vcc) of the integrated circuit 82 are connected to a junction 86. This junction is connected to the emitter of an NPN transistor 88, the collector of which is connected to junction 90. The base of transistor 88 is connected to a resistor 91 which in turn is connected to conductor 92. The conductor 92 is connected with a diode 94 which in turn is connected in series with the ignition switch 96 of the vehicle. The ignition switch 96 controls energization of the ignition system of the vehicle engine in a known manner and is closed when the engine is running or being cranked. It may be operated in conjunction with operation of the cranking motor control switch 40 in a manner well known to those skilled in the art. The opposite side of the ignition switch is connected to junction 44 via conductor 98. A time delay capacitor 100, the purpose of which will be described, is connected between conductor 92 and ground.

The integrated circuit 82 is connected, as shown, to resistors 101 and 102. A capacitor 104 is connected between junction 106 and ground. The junction 106 is connected to terminal 6 (Threshold) of integrated circuit 82 and the junction 108 is connected to terminal 7 (Discharge) of integrated circuit 82. Terminal 1 (Ground) of integrated circuit 82 is grounded and terminal 5 (Control Voltage) is connected to conductor 110. Further, terminals 2 (Trigger) and 6 of integrated circuit 82 are electrically connected as shown.

The junction 90 is connected to a terminal of a phototransistor opto-isolator 111 which comprises, in a single package, a light emitting diode 112 that applies light energy to a silicon NPN phototransistor 114. The anode of diode 112 is connected to a resistor 116 and a Zener diode 118 connects the resistor 116 to conductor 72. The collector of phototransistor 114 is connected to conductor 120 which in turn is connected to a junction 122. The junction 122 is connected to the control terminal 5 of integrated circuit 82 by conductor 110. A capacitor 124 is connected between conductor 110 and ground. The junction 122 is connected between resistors 124 and 126 that provide a voltage divider connected between conductor 128 and ground. A resistor 130 is connected between conductor 128 and junction 90. A Zener diode 132 is connected between conductor 128 and ground and therefore across the voltage divider resistors 124 and 126 to maintain a constant voltage across the resistors. The emitter of the phototransistor 114 is connected to ground via conductor 134. This connection effectively connects the collector-emitter circuit of phototransistor 114 between junction 122 and ground in parallel with resistor 126 so that the voltage at junction 122 will be reduced when the phototransistor 114 conducts.

The opto-isolator is known to those skilled in the art and may be for example a Litronix type 4N25. The amount of conduction between the collector and emitter electrodes of the phototransistor portion 114 depends upon the amount of light developed by the light emitting diode portion 112 of the device which in turn is a function of the current supplied to the light emitting diode.

The operation of the battery charger 52 will now be described on the assumption that battery 34 is a 12 volt battery and battery 36 a 4 volt battery. When ignition switch 96 is closed, either during cranking or running operation of the engine, the transistor 88 will be forward biased in its collector-emitter circuit to apply the voltage at junction 90 to terminals 4 and 8 of integrated circuit 82. Further, the closure of ignition switch 96 will cause the capacitor 100 to be charged from conductor 92. During this condition of operation, and assuming that the voltage across battery 36 is not sufficient to cause a break down of Zener diode 118, the integrated circuit 82 applies a square wave voltage to the base-emitter circuit of transistor 64 to cause this transistor to switch on and off. The output frequency of circuit 82 depends upon the resistance values of resistors 101 and 102 and the capacitance of capacitor 104 and the magnitude of voltage applied to the control terminal 5 of circuit 82. Since it is assumed that Zener diode 118 is nonconductive the transistor 114 is accordingly nonconductive and the voltage at junction 122 will be maintained at some constant value determined by the voltage divider ratio of resistors 124 and 126. The voltage applied to resistors 124 and 126 is maintained substantially constant by Zener diode 132. As an example, the circuit components can be arranged such that during this mode of operation the output frequency of circuit 82 at terminal 3 is approximately 200 Hz and arranged such that the transistor 64 is biased conductive for approximately 3.3 milliseconds and nonconductive for 1.6 milliseconds. This is assuming that the inductance of the inductor or inductance coil 60 is approximately 12 millihenries and has a resistance of approximately 2.5 ohms. The transistor 64 will therefore be switched on and off at a fixed duty cycle and fixed frequency determined by the voltage at junction 122. As an example, the components are selected such that when transistor 64 switches off a voltage pulse of approximately 20 volts is applied to battery 36 which is filtered down to a lower average value by battery 36. Further, the pulse frequency and pulse width is such that the current pulses applied to battery 36 have an average value in a range of 0.75 to 1 amp when the output frequency of circuit 82 is 200 Hz. Thus, the battery 36 is now being charged at a relatively low average current value from the voltage applied to conductors 54 and 56 either from battery 34 when the engine is not driving the generator or from the bridge rectifier 28 and battery 34 when the engine is running to charge battery 34.

If the voltage across the battery 36 exceeds some value, for example 5 volts, the charging current to the cranking battery 36 is reduced in order to prevent overcharging of battery 36. Thus, the Zener diode 118 and the circuitry connected in series therewith can be arranged such that when the terminal voltage of battery 36 is approximately 5 volts the Zener diode 118 breaks down thereby energizing the light emitting diode 112 of the opto-isolator. The fact that battery 36 is supplied with voltage pulses from coil 60 having an amplitude higher than the break down voltage of Zener diode 118 does not cause the Zener diode to break down at each pulse. The voltage pulses are reduced in magnitude by battery load 36 and the average value of the voltage pulses is not sufficient to break down Zener diode 118.

When the light emitting diode 112 is energized by break down of Zener diode 118 it applies light energy to the phototransistor 114 of the opto-isolator to cause it to conduct as a function of the current being supplied to light emitting diode 112. With transistor 114 conductive the voltage at junction 122 will decrease to thereby reduce the input voltage to control terminal 5 of the integrated circuit 82. This causes the output frequency of circuit 82 to increase while still maintaining the same percentage duty cycle. As a result the on time of transistor 64 and therefore the time period that inductor 60 is energized is reduced as is the off time and accordingly current is supplied to the inductor for shorter time periods. As a result of this the magnitude of the current that will be developed in inductor 60, when transistor 64 shuts off, will be decreased which results in a decrease in the voltage and resultant current pulse applied to battery 36. The average charging current supplied to battery 36 is accordingly reduced. The magnitude of this reduction depends on the terminal voltage of battery 36 which in turn determines the amount of current supplied to the light emitting diode 112 and therefore the conductance of transistor 114 in its collector-emitter circuit. Once the Zener diode 118 breaks down any further increase in the voltage of battery 36 will cause an increase in current to the light emitting diode 112, an increase in the amount of current conducted by transistor 114, a lowering of the voltage at junction 122 with a corresponding increase in output frequency of circuit 82 and a resultant substantially linear decrease in charging current to the battery 36 as a function of increasing terminal voltage. Conversely, a reduction in the voltage of battery 36 will cause an increase in charging current to the battery. In summary, battery 36 will be charged with a charging current that has an average value dependent upon the output frequency of oscillator integrated circuit 82. Once the terminal voltage of battery 36 is such as to cause Zener diode 118 to break down charging current is varied as an inverse function of the terminal voltage of the battery 36. The average charging current to battery 36 may be reduced to a range of about 0.1 to 0.3 amps when Zener diode 118 breaks down.

The system of this invention will cause the battery charger 52 to operate such that the accessory battery 34 will charge cranking battery 36 for a predetermined time period after the engine is shut down. Thus, when ignition switch 96 is opened to cut off the engine ignition system and therefore shut down the engine the transistor 88 will still be maintained conducting to apply a voltage to integrated circuit 82 since the charge on capacitor 100 maintains transistor 88 biased conductive. When ignition switch 96 is opened the capacitor 100 will discharge through resistor 91 and the connected circuitry at a time rate determined by the time constant of capacitor 100 and resistor 91. As an example, the time period required for capacitor 100 to discharge to a level where its voltage no longer biases transistor 88 conductive may be approximately 20 minutes. When this time period expires transistor 88 is biased nonconductive to deenergize circuit 82. There now is no output from oscillator circuit 82 with the result that transistor 64 is biased nonconductive and accordingly the charging of the battery 36 from battery 34 is terminated. During the time period that battery 34 is charging battery 36 the average charging current to battery 36 is regulated by the circuitry including Zener diode 118 and the opto-isolator 111 to thereby prevent overcharging of battery 36.

The purpose of resistor 130 is to limit the current into Zener diode 132. The resistor 84 determines the base current drive to transistor 64. The diode 94 ensures that capacitor 100 can only discharge through the base-emitter circuit of transistor 88 and through resistor 91. The resistor 116 limits the current into the opto-isolator. The capacitor 124 filters the voltage applied to control terminal 5 of circuit 82.

The purpose of the delayed shut off of the battery charger 52, which operates to charge battery 36 from battery 34 when the engine is shut down, is to compensate for short vehicle run times after energizing the cranking motor 42. Thus, each time the cranking motor 42 is energized the cranking battery 36 is depleted of a certain amount of energy. With the system of this invention the battery 36 is recharged from battery 34 even after the engine is shut down and the vehicle parked in order to replenish the battery 36 with energy previously utilized when cranking the engine by cranking motor 42. If battery 36 were only charged when the engine was running, to drive the generator, repeated short run operation of the engine could result in a substantial discharge of battery 36 since each time the engine is started energy must be supplied by battery 36 to crank the engine. In contrast, the system of this invention can charge battery 36 from battery 34 when the engine is shut down and therefore between cranking operations to recharge battery 36.

FIG. 2 illustrates a modification that can be made to the system shown in FIG. 1 in order to provide delayed shut off of certain electrical loads on the motor vehicle at a predetermined time period after the ignition switch 96 is opened to shut down the engine. This modification provides a system in which the inductor or coil 60 not only serves its FIG. 1 function of providing controlled amounts of energy for charging battery 36 but also serves to deenergize certain electrical loads at a predetermined time period following the opening of ignition switch 96. In the circuit of FIG. 2 the same reference numerals have been used as were used in FIG. 1 to identify corresponding parts. The inductor in FIG. 2 is identified as 60A and insofar as battery charging current control is concerned the inductor coil 60A performs the same function as the inductor 60 of FIG. 1. In FIG. 2, however, the coil 60A is the actuating coil of a magnetic switch that includes a movable contact 60B and a fixed contact 60C. The movable contact 60B is normally biased out of contact with fixed contact 60C by a spring which is not illustrated. When actuating coil 60A is energized the contact 60B is moved into engagement with the fixed contact 60C. In the circuit of FIG. 2 the fixed contact 60C is connected to a conductor 140 which is connected in series with a switch 142. The switch 142 controls the energization of an electrical load designated by reference numeral 144. As one example, the switch 142 may be the headlight switch on a motor vehicle and the electrical load 144 may be the head lamps of the motor vehicle. It can be seen that the relay contacts 60B and 60C control the connection of the accessory battery 34 with the load circuit including conductor 140, switch 142 and electrical load 144.

The operation of the modified circuit of FIG. 2 will now be described. Assuming that the circuit of FIG. 1 has been modified, to take the form shown in FIG. 2, the transistor 64 as it switches on and off will energize and deenergize the magnetic switch coil 60A. This will provide the same function as inductor 60, in FIG. 1, for charging battery 36 but also maintains relay contacts 60B and 60C closed. The relay contacts are maintained closed due to the relatively high frequency of the current pulses applied to magnetic switch coil 60A caused by the switching of transistor 64 at the output frequency of oscillator circuit 82.

When ignition switch 96 is opened the circuit of FIG. 2 will still cause current to be supplied in pulses to the magnetic switch coil 60A so that contacts 60B and 60C are maintained closed for the timing period determined by capacitor 100 and battery 36 continues to be charged from battery 34. When the circuit times out, in a manner previously described, the integrated circuit 82 no longer biases transistor 64 on and off with the result that transistor 64 shuts off. This deenergizes the magnetic switch coil 60A with the result that contacts 60B and 60C open. This will deenergize the load circuit including conductor 140, switch 142 and electrical load 144. Thus, if the load 144 is a head lamp load and the switch 142 is a head lamp switch the head lamps would be automatically deenergized even though switch 142 was inadvertently left in a closed position.

The electrical loads that are disconnected by the system of FIG. 2 could be loads other than the head lamps and were it desired to completely disconnect all vehicle electrical loads from accessory battery 34 the relay switch contacts 60B and 60C could be connected in series with the conductor 46 of FIG. 1 to completely disconnect all motor vehicle accessory loads after a certain time period. This is assuming that the head lamps would now be fed via conductor 46. It therefore is seen that with the modification of FIG. 2 the battery 36 is charged from battery 34 for a certain time period after the engine is shut down and, further, certain electrical loads are disconnected from the accessory battery 34 when this time period expires. This has been accomplished by the inductor coil 60A which performs the dual function of storing and releasing electrical energy and operating switch contacts.

In summary, the battery charging circuit 52 operates to charge battery 36 when the engine is running to drive generator 10 and for a time period after the engine is shut down and in each case it regulates the charging current to cranking battery 36 as an inverse function of its terminal voltage. The charger 52 is comprised of relatively low cost and lower power components and has a relatively low efficiency of about 50% and therefore provides a relatively low level charging current to battery 36 when the engine is running to drive generator 10 or when the engine is shut down. Nevertheless, the system of this invention can maintain the cranking battery 36 at a proper state of charge due to the fact that battery 36 can be charged after the engine is shut down and the system of this invention is applicable to any dual battery charging arrangement where the cranking battery may not be sufficiently charged by the engine driven generator during running operation of the vehicle.

In the foregoing specification, various specific values have been set forth for time periods, battery charging current for battery 36 and circuit components. These can be varied to suit the particular requirements of a system.

The accessory battery 34 and cranking battery 36 can be separate batteries each having its own case or the two batteries can be provided in a single case. In the latter case the battery has an intermediate tap terminal corresponding to junction 26, a positive terminal corresponding to junction 38 and a negative terminal corresponding to the grounded terminal of battery 34.

The embodiments of the invention in which an exclusive property or privilege is claimed are defined as follows:

1. A dual voltage motor vehicle electrical system comprising in combination, first and second series connected batteries for supplying an electrical engine cranking motor with a voltage corresponding to the sum of the voltages of the batteries, at least one of said batteries being connected to supply at least one other electrical load with a lower voltage corresponding to its terminal voltage, a voltage regulated direct voltage generating means driven by the engine of the vehicle, conductor means connecting the output terminals of said generating means to the terminals of said first battery whereby said first battery is charged by said generating means, a control means having an input connected to said conductor means and an output connected to the terminals of said second battery for charging said second battery from the voltage applied to said conductor means, said control means including means for varying the charging current supplied to said second battery as a function of the terminal voltage of said second battery, and means for maintaining said control means in operation for a predetermined time period following shut down of said engine to charge said second battery from said first battery for said time period.

2. A dual voltage motor vehicle electrical system comprising, first and second series connected batteries, an electrical vehicle engine cranking motor adapted to be connected across said series connected batteries so as to be energized by the sum of the terminal voltages of said batteries, a battery charging generator driven by the engine of the vehicle, conductor means connecting said generator across said first battery to charge said first battery, an energy storage device, circuit means including a diode connecting said energy storage device across said second battery, a circuit including a switching means connecting said energy storage device across said conductor means and first battery, control means for causing said switching means to switch on and off at predetermined frequency whereby said energy storage device is charged by the voltage across said conductor means when said switching means is conductive and supplies energy to said second battery through said diode when nonconductive, and means for maintaining said control means in operation for a time period after shut down of said engine to thereby charge said second battery from said first battery for said time period.

3. A dual voltage motor vehicle electrical system comprising, first and second series connected batteries, an electrical vehicle engine cranking motor adapted to be connected across said series connected batteries so as to be energized by the sum of the terminal voltages of said batteries, a battery charging generator driven by the engine of the vehicle, conductor means connecting said generator across said first battery to charge said first battery, an inductor, circuit means including a diode connecting said inductor across said second battery, a circuit including a switching means connecting said inductor across said conductor means and first battery, an oscillator coupled to said switching means to cause it to switch on and off at the output frequency of the oscillator whereby said inductor is energized by the voltage across said conductor means when said switching means is conductive and supplies energy to said second battery through said diode when nonconductive, means for varying the output frequency of said oscillator as a function of the terminal voltage of said second battery to control the average charging current to said second battery, and means for maintaining said oscillator in operation for a time period after shut down of said engine to thereby charge said second battery from said first battery for said time period.

4. A motor vehicle electrical system comprising, first and second series connected batteries, an electric cranking motor adapted to be connected across said batteries to be energized thereby, a generator driven by the vehicle engine connected to charge said first battery, a magnetic switch comprising an actuating coil and switch contacts which are closed when said actuating coil is energized and open when said coil is not energized, switching means for connecting and disconnecting said actuating coil to and from said first battery at a switching rate that is sufficient to maintain said magnetic switch contacts closed, means for applying energy stored in said actuating coil to said second battery when said switching means disconnents said actuating coil and first battery, an electrical load circuit for feeding an electrical load, means connecting said magnetic switch contacts between said first battery and said electrical load circuit, and means for maintaining said switching means in operation for a time period after engine shut down to thereby charge said second battery from said first battery and maintain said first battery connected to said electrical load circuit for said time period, the termination of operation of said switching means being operative to terminate charging of said second battery and operative to cause said magnetic switch contacts to open to disconnect said first battery from said load circuit.

5. An electrical system for charging a first storage battery from a second storage battery and for connecting and disconnecting an electrical load circuit to and from said second battery comprising, first and second storage batteries, a magnetic switch having an actuating coil and switch contacts which are closed when the actuating coil is energized, the switch contacts opening when the actuating coil is not energized, means connecting the switch contacts of said magnetic switch between said second battery and said load circuit whereby said load circuit and second battery are connected when said switch contacts are closed and are disconnected when said switch contacts are open, a switching means for connecting and disconnecting said actuating coil to and from said second battery at a switching rate that is sufficient to maintain said magnetic switch contacts closed, means for supplying energy stored in said actuating coil to said first battery when said switching means disconnects said actuating coil and second battery, and means for deenergizing said actuating coil to thereby cause termination of the charging of said first battery from said second battery and cause said magnetic switch contacts to open to disconnect said second battery and load circuit.

* * * * *